Nov. 24, 1942.  K. S. LION  2,302,874
SHORT WAVE DOSIMETER
Filed Oct. 23, 1940
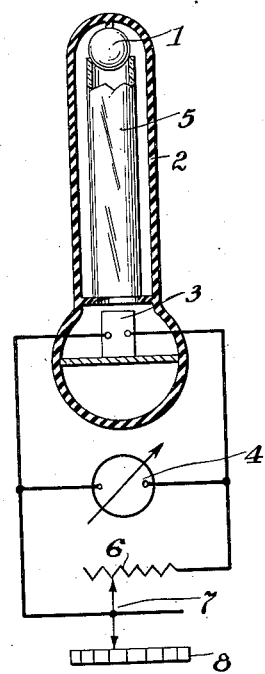
INVENTOR:
Kurt S. Lion
BY
ATTORNEY.

Patented Nov. 24, 1942

2,302,874

UNITED STATES PATENT OFFICE 2,302,874

SHORT WAVE DOSIMETER

Kurt S. Lion, Watertown, Mass., assignor to Siegmund Strauss, New York, N. Y.; Paul Baeck executor of said Siegmund Strauss, deceased Application October 23, 1940, Serial No. 362,477
In Switzerland October 18, 1939

6 Claims. (Cl. 171—95)

The invention relates to a short-wave dosimeter as applied to short-wave therapy using electrical and magnetic high frequency fields as well as electromagnetic radiation fields. The invention finds further application in high frequency equipments for measuring potentials, field strength and related magnitudes.

The underlying principle of the invention will be described as applied to therapy using high-frequency electric fields, it being understood that the invention can equally be used for other applications.

In short-wave therapy it is desired to have a means of measuring the dose or energy which is administered to the patient. Measuring instruments are known which measure the potential difference at the electrodes of the high-frequency generator or which measure the current passing through the condenser. Wattmeters are also known which give a measure of the high-frequency power absorbed by the patient. These appliances however, give no indication as to the distribution of the energy applied, an indication which is very important and desirable to know. The object of the invention is to avoid the aforesaid disadvantages in enabling a point to point distribution of energy in the object itself or at some point outside the object to be measured.

To these ends the invention consists of an electrodeless gas discharge tube containing a gas under reduced pressure, this being placed in the field the strength of which it is desired to measure. The dimensions of the said tube are so chosen as to be small in comparison to the extension of the field to be measured. Under the action of the high-frequency field produced by an electrical apparatus a luminous discharge ensues in the tube the brightness of which can be measured by some photometric arrangement and expressed in terms of the field strength prevailing at the location of the discharge tube.

The intensity of the luminous discharge can be measured by some known photometric means; as also subjectively, the latter method however, furnishing rough values only. It can be effected by comparison with a calibrated source of light or some known electrical device sensitive to electromagnetic radiation. The discharge tube is advantageously combined with the photometric arrangement in a housing to form one unit, which housing is so arranged as to exclude all external sources of light and to enable the said unit being conveniently brought into the field to be measured.

Figure 1 diagrammatically illustrates the device. The discharge tube 1 is located in the interior and at one end of an opaque insulated tube 2 at the other end of which a photometric cell 3 is situated. The cell 3 on being impinged upon by the light rays emitted from the discharge tube, causes a deflection on the instrument 4 connected to the cell, the reading of which gives a measure of the field strength prevailing at the discharge tube.

The brightness of the gas discharge is not only dependent upon the field strength but also on the orientation of the tube with reference to the electric field vector. It is greatest when the longitudinal axis of the tube lays parallel to the field vector. By turning the tube in different directions the user has a means of determining the direction and magnitude of the field under observation. In short-wave therapy the absolute value of the field strength is of interest only and not its direction. In order to make the reading of the device independent of its orientation in the field, the discharge tube is according to this invention, spherical in shape. As can easily be understood from a physical point of view, such a tube will have a gas discharge brightness which is independent of the direction of the field and which solely depends upon the absolute intensity of the latter.

In order to obtain the greatest possible sensitivity from the device when measuring weak fields it is necessary to cause the greatest amount of light from the discharge tube to reach the photoelectric cell. To this end an optical arrangement can be placed between the discharge tube and the photo-electric cell. This consists advantageously of a non-metallic hollow reflecting body (as for example a glass tube) placed between the discharge tube and the cell in such a way that the sides of the tube reflect the light rays issuing from the discharge tube upon the photo-cell. In Figure 1 such a combination is illustrated, the glass tube 5 being interposed between the discharge tube 1 and the photoelectric cell 3.

The light emission of the gas discharge is dependent on the frequency at which the field to be measured oscillates, the calibration of the dosimeter thus only holding good for the frequency at which it has been calibrated. In order to enable the dosimeter being used over a wide frequency range, an adjustable setting device can be added which, when set at the particular frequency in use, alters the photometric characteristics in such a manner that the same calibration curve of the instrument 4 holds good. In Figure 1 a variable resistance 6 is connected in parallel to the indicating instrument 4. For each frequency used, which is indicated on the calibrated scale 8, the indicating instrument possesses a corresponding sensitivity, whereby variations in the light emission characteristics resulting from changes in frequency are compensated enabling the same calibration curve being used.

The optical method of field strength measurement described, avoids the use of metallic conductors and leads, as also such quantities of dielectrics which would influence and disturb the field to be measured. The reading of the dosimeter is dead beat and free from lagging effects. The dosimeter is simple to handle and not influenced to any practicable extent by temperature variations and surrounding conditions. The measuring organs are not grounded and have a negligible capacity to earth, enabling the device to be used on short-wave generators grounded at will.

Having now particularly described and ascertained the nature of the said invention and in what manner the same is to be performed, I declare that what I claim is:

1. A device for measuring the local intensity at various points of a high frequency field produced by an electrical apparatus, comprising a tube-like light-tight hollow holder of insulating material closed at its ends, said holder being freely movable in all directions for a point by point introduction into the field, a luminous electric gas discharge tube free from electrical connections to said apparatus and of small dimensions relatively to the dimensions of the field, said gas discharge tube being arranged within said hollow holder at one end thereof, and a photometric device including a photo-electric cell and a measuring instrument electrically connected with said photo-electric cell, said photo-electric cell being arranged within said light-tight hollow holder at a point spaced from said gas discharge tube so as to receive the light emitted from said gas discharge tube when excited by a field for ascertaining the brightness of the luminous discharge by the measuring instrument and thus measuring the intensity of the field at the point where the gas discharge tube is positioned.

2. A device for measuring the local intensity at various points of a high frequency field produced by an electrical apparatus, comprising a tube-like light-tight hollow holder of insulating material closed at its ends, said holder being freely movable in all directions for a point by point introduction into the field, a luminous electric electrode-less low pressure gas discharge tube free from electrical connections to said apparatus and of small dimensions relatively to the dimensions of the field, said gas discharge tube being arranged within said hollow holder at one end thereof, and a photometric device including a photo-electric cell and a measuring instrument electrically connected with said photo-electric cell, said photo-electric cell being arranged within said light-tight hollow holder at a point spaced from said gas discharge tube so as to receive the light emitted from said gas discharge tube when excited by a field for ascertaining the brightness of the luminous discharge by the measuring instrument and thus measuring the intensity of the field at the point where the gas discharge tube is positioned.

3. A device for measuring the local intensity at various points of a high frequency field produced by an electrical apparatus, comprising a tube-like light-tight hollow holder of insulating material closed at its ends, said holder being freely movable in all directions for a point by point introduction into the field, a spherical luminous electric gas discharge tube free from electrical connections to said apparatus and of small dimensions relatively to the dimensions of the field, said gas discharge tube being arranged within said hollow holder at one end thereof, and a photometric device including a photo-electric cell and a measuring instrument electrically connected with said photo-electric cell, said photo-electric cell being arranged within said light-tight hollow holder at a point spaced from said gas discharge tube so as to receive the light emitted from said gas discharge tube when excited by a field for ascertaining the brightness of the luminous discharge by the measuring instrument and thus measuring the intensity of the field at the point where the gas discharge tube is positioned.

4. A device for measuring the local intensity at various points of a high frequency field produced by an electrical apparatus, comprising a tube-like light-tight hollow holder of insulating material closed at its ends, said holder being freely movable in all directions for a point by point introduction into the field, a spherical luminous electric electrode-less low pressure gas discharge tube free from electrical connections to said apparatus and of small dimensions relatively to the dimensions of the field, said gas discharge tube being arranged within said hollow holder at one end thereof, and a photometric device including a photo-electric cell and a measuring instrument electrically connected with said photo-electric cell, said photo-electric cell being arranged within said light-tight hollow holder at a point spaced from said gas discharge tube so as to receive the light emitted from said gas discharge tube when excited by a field for ascertaining the brightness of the luminous discharge by the measuring instrument and thus measuring the intensity of the field at the point where the gas discharge tube is positioned.

5. A device for measuring the local intensity at various points of a high frequency field produced by an electrical apparatus, comprising a tube-like light-tight hollow holder of insulating material closed at its ends, said holder being freely movable in all directions for a point by point introduction into the field, a luminous electric gas discharge tube free from electrical connections to said apparatus and of small dimensions relatively to the dimensions of the field, said gas discharge tube being arranged within said hollow holder at one end thereof, a photometric device including a photo-electric cell and a measuring instrument electrically connected with said photo-electric cell, said photo-electric cell being arranged within said light-tight hollow holder at a point spaced from said gas discharge tube, and a non-metallic internally reflecting tube interposed between said gas discharge tube and said photo-electric cell within said hollow holder so as to reflect the light rays emitted from said gas discharge tube, when excited by a field, upon the photo-electric cell for ascertaining the brightness of the luminous discharge by the measuring instrument and thus measuring the intensity of the field at the point where the gas discharge tube is positioned.

6. A device for measuring the local intensity at various points of a high frequency field produced by an electrical apparatus, comprising a tube-like light-tight hollow holder of insulating material closed at its ends, said holder being freely movable in all directions for a point by point introduction into the field, a spherical luminous electric gas discharge tube free from electrical connections to said apparatus and of small dimensions relatively to the dimensions of the field, said gas discharge tube being arranged within said hollow holder at one end thereof, a photometric device including a photo-electric cell and a measuring instrument electrically connected with said photo-electric cell, said photo-electric cell being arranged within said light-tight hollow holder at a point spaced from said gas discharge tube, and a non-metallic internally reflecting tube interposed between said gas discharge tube and said photo-electric cell within said hollow holder so as to reflect the light rays emitted from said gas discharge tube, when excited by a field, upon the photo-electric cell for ascertaining the brightness of the luminous discharge by the measuring instrument and thus measuring the intensity of the field at the point where the gas discharge tube is positioned.

KURT S. LION.